(12) United States Patent
Minowa

(10) Patent No.: US 11,067,854 B2
(45) Date of Patent: Jul. 20, 2021

(54) METHOD OF APPLYING ALIGNMENT FILM, AND COLOR FILTER SUBSTRATE

(71) Applicant: Mitsubishi Electric Corporation, Tokyo (JP)

(72) Inventor: Kenichi Minowa, Kikuchi (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/906,303

(22) Filed: Jun. 19, 2020

(65) Prior Publication Data

US 2020/0319486 A1 Oct. 8, 2020

Related U.S. Application Data

(62) Division of application No. 15/078,089, filed on Mar. 23, 2016, now abandoned.

(30) Foreign Application Priority Data

Apr. 6, 2015 (JP) ................................. 2015-077368

(51) Int. Cl.
*B05D 1/28* (2006.01)
*G02F 1/1337* (2006.01)

(52) U.S. Cl.
CPC ........... *G02F 1/1337* (2013.01); *B05D 1/286* (2013.01); *C09K 2323/06* (2020.08)

(58) Field of Classification Search
CPC ....... G02F 1/1337; B05D 1/286; B05D 3/002; B05D 3/005; Y10T 428/1086; C09K 2323/06; C09K 2323/02; H01L 21/02639; H01L 2224/0355
See application file for complete search history.

(56) References Cited

U.S. PATENT DOCUMENTS

| 5,558,927 A | 9/1996 | Aruga et al. |
| 5,643,471 A | 7/1997 | Onishi et al. |
| 5,726,728 A | 3/1998 | Kondo et al. |

(Continued)

FOREIGN PATENT DOCUMENTS

| JP | H08-095012 A | 4/1996 |
| JP | H08-278504 A | 10/1996 |

(Continued)

OTHER PUBLICATIONS

An Office Action dated Nov. 20, 2018, which corresponds to Japanese Patent Application No. 2015-077368 and is related to U.S. Appl. No. 15/078,089; with English translation.

*Primary Examiner* — Sophie Hon
(74) *Attorney, Agent, or Firm* — Studebaker & Brackett PC

(57) ABSTRACT

A method of applying an alignment film on a substrate of a liquid crystal panel, the method includes: forming a surface having high wettability and a surface having low wettability, with respect to a material of the alignment film; bringing uniformly the material of the alignment film into contact with the surface having high wettability and the surface having low wettability when the material of the alignment film on the substrate is applied by using a transfer plate; and separating the transfer plate and the surface of the substrate such that the material of the alignment film is left on the surface having high wettability and the material of the alignment film is not left on the surface having low wettability.

3 Claims, 3 Drawing Sheets

(56) References Cited

U.S. PATENT DOCUMENTS

| | | |
|---|---|---|
| 8,053,171 B2 | 11/2011 | Maekawa et al. |
| 8,293,457 B2 | 10/2012 | Maekawa et al. |
| 9,470,931 B2 * | 10/2016 | Shao .................... G02F 1/13378 |
| 2002/0196406 A1 | 12/2002 | Inoue |
| 2006/0172091 A1 | 8/2006 | Tung et al. |
| 2006/0210704 A1 | 9/2006 | Kimura et al. |
| 2007/0023837 A1 | 2/2007 | Lee et al. |
| 2008/0137022 A1 | 6/2008 | Komeno et al. |
| 2009/0073357 A1 | 3/2009 | Takahashi et al. |
| 2009/0122244 A1 | 5/2009 | Motomatsu |
| 2013/0122621 A1 | 5/2013 | Zhu et al. |
| 2015/0062515 A1 | 3/2015 | Tomioka et al. |
| 2016/0011451 A1 * | 1/2016 | Shao ..................... G02F 1/1337 445/24 |

FOREIGN PATENT DOCUMENTS

| | | | |
|---|---|---|---|
| JP | H11-092659 A | 4/1999 | |
| JP | H11-119221 A | 4/1999 | |
| JP | 2003-005186 A | 1/2003 | |
| JP | 2004-148309 A | 5/2004 | |
| JP | 2004-341336 A | 12/2004 | |
| JP | 2005-334864 A | 12/2005 | |
| JP | 2007-164165 A | 6/2007 | |
| JP | 2009-069522 A | 4/2009 | |
| JP | 2011-143404 A | 7/2011 | |
| JP | 2015-049434 A | 3/2015 | |
| JP | 6528517 B2 * | 6/2019 | ........... G02F 1/1337 |
| KR | 10-2008-0059493 A | 6/2008 | |
| WO | WO-2015113367 A1 * | 8/2015 | ....... G02F 1/133351 |

* cited by examiner

US 11,067,854 B2

METHOD OF APPLYING ALIGNMENT FILM, AND COLOR FILTER SUBSTRATE

CROSS-REFERENCE TO RELATED APPLICATION

This application is a Divisional application of U.S. patent application Ser. No. 15/078,089 filed on Mar. 23, 2016, which claims priority from Japanese Patent Application No. 2015-077368 filed on Apr. 6, 2015, the entire subject matter of which is incorporated herein by reference.

TECHNICAL FIELD

The present invention relates to a method of applying an alignment film on a glass substrate constituting a liquid crystal panel and a color filter substrate using thereof.

BACKGROUND

Recently, as improving of lightweight, slimness and low power consumption of a flat panel display (FPD) such as a liquid crystal panel, the FPD has been widely used in many fields such as a television, a car navigation apparatus and a computer. Although the size and definition of the panel have increased yearly, various shapes or sizes of the panel are required according to usage thereof. A response to the small lot production of many products of a liquid crystal panel is essentially required.

The liquid crystal panel has a pair of substrates facing each other, a spacer for holding uniformly the substrates and liquid crystal filled between the substrates. One substrate is referred to as an active matrix type substrate on which a thin film transistor (TFT) is formed (hereinafter, referred to as a TFT substrate) and a counter substrate is referred to as a color filter substrate (hereinafter, referred to as a CF substrate). A conductive film is formed on each substrate, and liquid crystal is driven and controlled by charges stored between the conductive films.

It is difficult to control driving of liquid crystal in a transistor forming portion or a wiring portion of the TFT substrate, as compared to driving of liquid crystal in a display portion. A shield region is formed at the counter CF substrate to suppress transmission of light, thereby obtain beautiful display.

In the liquid crystal panel, it is necessary to uniformly arrange liquid crystal molecules in a light transmission region. By applying a voltage to the liquid crystal molecules, the arrangement direction of the liquid crystal molecules is changed, thereby controlling the direction of passage of light. An alignment film is uniformly applied on the surfaces of the TFT substrate and the CF substrate, and a process of rubbing the surfaces using rubbing cloth needs to be performed.

The method of applying the alignment film includes, for example, a method of an alignment film from nozzles (JP-A-2004-148309) and a printing method using a transfer plate (JP-A-11-92659 and JP-A-2003-5186). In the spraying method, various plates are not required for each product type, but irregularities in spraying from nozzles are apt to occur, so that it is difficult to control uniformity of the film thickness. In particular, in a high-definition panel, nonuniformity of the thickness of the alignment film is critical. In the printing method, it is easy to make the film thickness uniform, but when various kinds of products are manufactured, each patterned transfer plate is required for each product (see paragraph 0004 of JP-A-11-92659 or paragraph 0031 of JP-A-2003-5186).

SUMMARY

In the process of transferring the alignment film, when the alignment film is applied on the glass substrate of the liquid crystal panel, the alignment film needs to be selectively applied according to a region, in which an alignment film is applied and which is mainly a display region, and a region, in which an alignment film is not applied and which is a peripheral portion of the display region. The region, in which the alignment film is not applied, is a region, in which a peripheral seal material or mounting member of the liquid crystal panel is attached at a higher layer, or a region, in which an inspection terminal onto which a needle is brought into contact upon inspection is located.

That is, if the seal material of the liquid crystal panel is applied on the alignment film, the alignment film is not applied since the adhesion will deteriorate. If the alignment film is applied in the region, in which the mounting member is attached, or on the inspection terminal onto which the needle is brought into contact, a resistance value changes so that it is difficult to drive the liquid crystal panel. Since the region, in which the alignment film is not applied, needs to be formed, in the alignment film transferring method capable of easily making the thickness of the alignment film uniform, each transfer plate for selectively applying the alignment film in the region in which the alignment film is applied and the region, in which the alignment film is not applied, is required for each product type when various types of products are manufactured.

Accordingly, in the alignment film applying process of in the alignment film transferring method, management of the transfer plate for each type of the liquid crystal panel is needed, and designing and manufacturing according to storage places and product types are needed. Further, if a problem occurs in the transfer plate, since the transfer plate is not replaced with another type of transfer plate, a plurality of transfer plates is necessary for each product type. Therefore, management costs further increase. In addition, upon production of products, in the alignment film applying process, a process of replacing the transfer plate according to product types is necessary and thus production loss occurs.

In the present invention, in a process of applying alignment films on various types of products which are different in size or surface mounting of a glass substrate of a liquid crystal panel, more particularly, a CF substrate without a terminal, the thickness of the alignment film is uniformly formed. Further, manufacture or management of a transfer plate in a process of transferring an alignment film is simplified, and loss of a production time due to a step-up replacement operation by changing of the type of the product is reduced.

In one aspect of the present invention, according to a method of applying an alignment film on a substrate of a liquid crystal panel, the method includes: forming a surface having high wettability and a surface having low wettability, with respect to a material of the alignment film; bringing uniformly the material of the alignment film into contact with the surface having high wettability and the surface having low wettability when the material of the alignment film on the substrate is applied by using a transfer plate; and separating the transfer plate and the surface of the substrate such that the material of the alignment film is left on the surface having high wettability and the material of the alignment film is not left on the surface having low wettability.

A substrate for a liquid crystal panel according to another aspect of the present invention includes a surface, on which a material of an alignment film is applied, the surface of the substrate has a region having high wettability and a region having low wettability, with respect to a material of the alignment film, and the region having high wettability corresponds to a display region of the liquid crystal panel and the region having low wettability corresponds to a peripheral region of the display region.

According to the present invention, a plurality of types of transfer plates becomes unnecessary and management costs decrease. In an alignment film applying process, since a step-up operation for replacing a transfer plate according to product types becomes unnecessary, productivity is improved.

BRIEF DESCRIPTION OF THE DRAWINGS

The foregoing and additional features and characteristics of this disclosure will become more apparent from the following detailed descriptions considered with the reference to the accompanying drawings, wherein.

DETAILED DESCRIPTION

Figure 1:
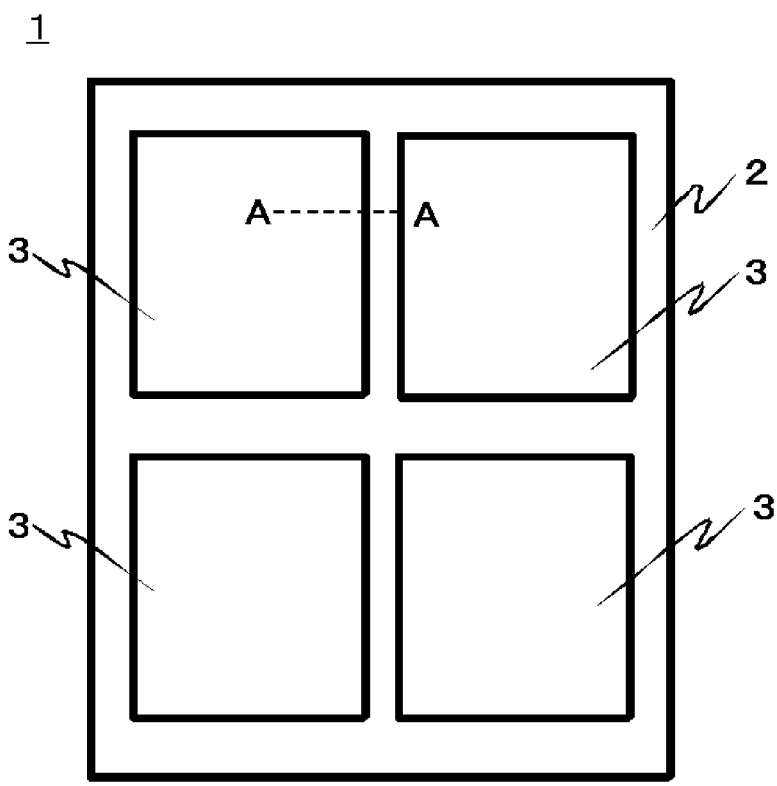
FIG. 1 is a schematic plan view of a CF substrate according to Embodiment 1 of the present invention.

Hereinafter, embodiments of the present invention will be described with reference to the drawings. In order to avoid a repetitive description, elements having the same or similar functions of the drawings are denoted by the same reference numerals.

Embodiment 1

Figure 2:
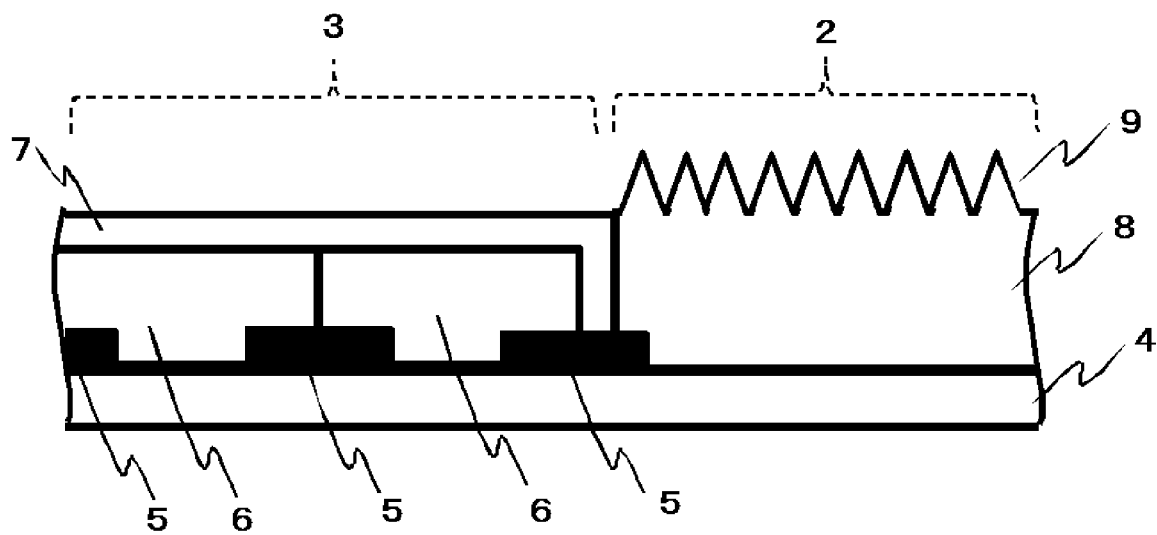
FIG. 2 is a schematic cross-sectional view of FIG. 1.
Figure 3:
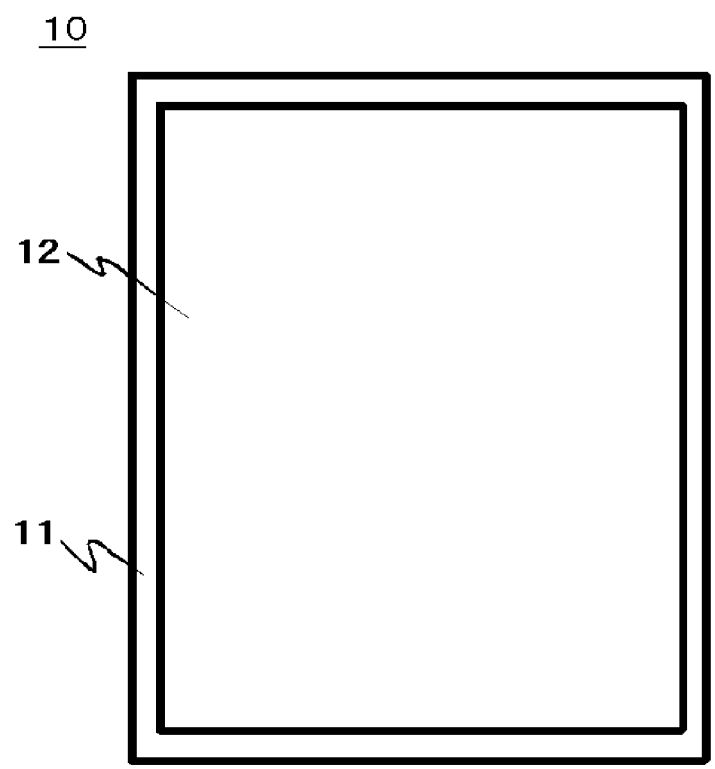
FIG. 3 is a schematic plan view showing an alignment film transfer plate according to Embodiments 1 and 2 of the present invention.
Figure 4:
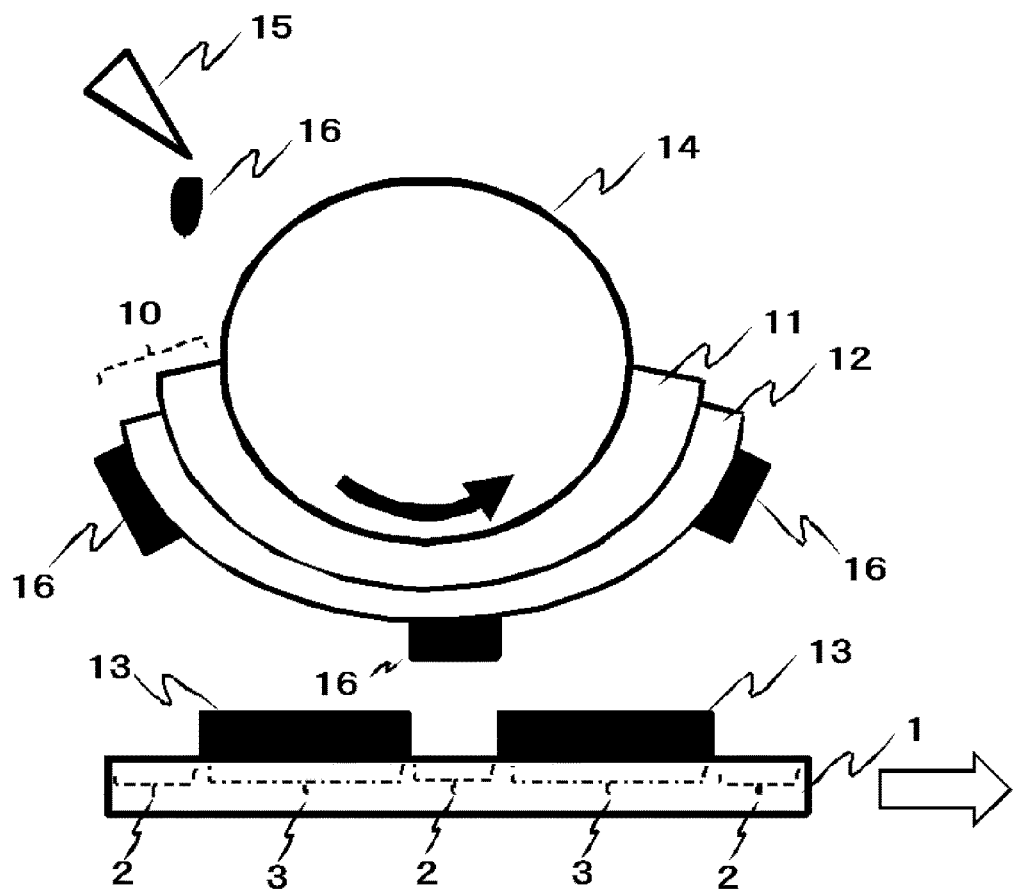
FIG. 4 is a schematic view of a state of applying an alignment film according to Embodiments 1 and 2 of the present invention.

Hereinafter, Embodiment 1 of the present invention will be described in detail with reference to the figure. FIG. 1 is a schematic plan view of a CF substrate which is one substrate of a pair of substrates facing each other, of a liquid crystal panel. In the present embodiment, since a TFT substrate, which is another substrate, using a general TN liquid crystal mode is employed as a TFT substrate, the TFT substrate will not be specially described. FIG. 2 is a schematic cross-sectional view of FIG. 1, in which the liquid crystal panel has a cross-sectional structure corresponding to the TN liquid mode. FIG. 3 is a schematic plan view showing an alignment film transfer plate used in the present invention, and FIG. 4 is a schematic view of a state of applying an alignment film in the present invention.

<Configuration of CF Substrate>

First, as shown in FIG. 1, the CF substrate 1 is manufactured such that a surface thereof includes a region 2 having low wettability and a region 3 having high wettability. That is, in the present embodiment, when the surface of the CF substrate 1 is formed, the region 2 having low wettability corresponds to a region, in which an alignment film is not applied, and the region 3 having high wettability corresponds to a region, in which the alignment film is applied. The "wettability" of the surface of the substrate described herein means the high/low level (good/bad) of wettability with respect to the material of the alignment film.

FIG. 2 is a cross-sectional view taken along a dotted line A-A of FIG. 1. As shown in FIG. 2, as the longitudinal structure of the region 3 having high wettability, a shield region 5 of a light shielding layer, a color material 6 of a transmission layer and a conductive film 7 are sequentially laminated on the glass substrate 4 from a lower layer thereof. The conductive film 7 of a display region needs to be a transparent film having high wettability, and an ITO film or an IGZO film may be used as a counter electrode material constituting a pixel.

As the longitudinal structure of the region 2 having low wettability, which is the peripheral portion of the display region, an organic film 8 having low wettability is formed on the glass substrate 4. The surface of the organic film 8 needs to have an oil repelling property for repelling the alignment film, and the surface 9 of the organic film 8 has fine irregularities. As a material thereof, organic fluoride or acrylic resin of photocurable resin, polyimide resin or the like may be used.

<Alignment Film Applying Process>

First, the configuration of the transfer plate necessary for applying the alignment film will be described. As shown in FIG. 3, the transfer plate 10 used to apply the alignment film is composed of a transfer-plate convex portion 12 for applying an alignment film material on a transfer-plate base 11. As the material of the transfer plate, polybutadiene rubber or the like may be used. The transfer-plate convex portion 12 has no concave portion for distinguishing between a region in which the alignment film 13 is attached and a region in which the alignment film is not attached and has a uniform solid pattern.

Next, as shown in the schematic diagram showing the applying of the alignment film of FIG. 4, when the material 16 of the alignment film is applied on the CF substrate 1 using a printing method, the material 16 of the alignment film is dropped from an alignment-film supplying nozzle 15 and attached to the surface of the transfer-plate convex portion 12 of the transfer plate 10 attached to a transfer device body 14.

In the alignment film applying process, after the transfer plate 10 wound on the transfer device body 14 and the CF substrate 1 are aligned, a stage (not shown), on which the CF substrate 1 is hold, moves in a direction denoted by a white arrow in synchronization with rotation of the transfer device body 14 in a direction denoted by a black arrow, and the transfer-plate convex portion 12 is sequentially brought into contact with the CF substrate from the end of the CF substrate 1, thereby performing a transfer operation.

As described above, the region 2 having low wettability and the region 3 having high wettability exist on the surface of the CF substrate 1. As described above, when the transfer-plate convex portion 12 is brought contact with the surface of the CF substrate 1, the material 16 of the alignment film contacted to the transfer-plate convex portion 12 is brought into contact with both of the region 2 having low wettability and the region 3 having high wettability. However, after the transfer-plate convex portion 12 is separated from the CF substrate 1 according to movement of the CF substrate 1, the material 16 of the alignment film is selectively attached to only the region 3 due to a difference in wettability. The material 16 of the alignment film brought into contact with the region 2 having low wettability is left on the transfer-plate convex portion 12 without being attached to the CF substrate 1.

Incidentally, although the transfer-plate convex portion 12 and the CF substrate 1 are shown as being separated from each other at a predetermined distance in FIG. 4, this is exaggerated in order to easily distinguish between the region 2 having low wettability and the region 3 having high wettability. Actually, as described above, the transfer-plate convex portion and the CF substrate are in contact with each other with interposing the material 16 of the alignment film.

The material 16 of the alignment film left on the CF substrate 1 becomes the alignment film 13 via general subsequent processes such as dry, firing or the like and the alignment film is selectively formed on the CF substrate 1.

Embodiment 2

In the present embodiment, since the TFT substrate, which is one substrate, using a general IPS liquid crystal mode is employed as the TFT substrate, a description thereof will be omitted. The plan view (FIG. 1) of CF substrate 1, the alignment film transfer plate (FIG. 3), the alignment film applying process (FIG. 4) or the like are equal to those of Embodiment 1 and thus a detailed description thereof will be omitted.

Figure 5:
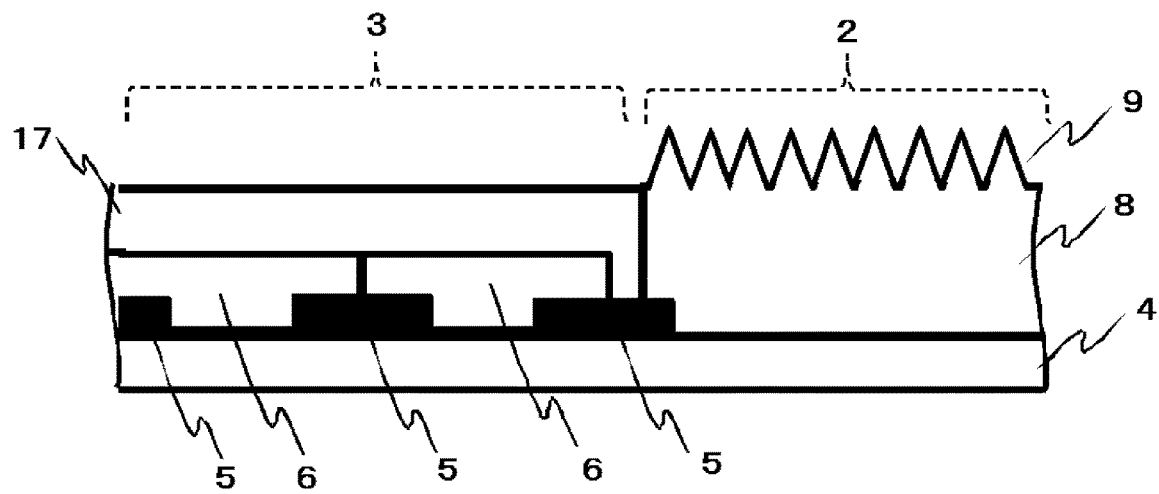
FIG. 5 is a schematic cross-sectional view of a CF substrate according to Embodiment 2 of the present invention.

FIG. 5 is a schematic cross-sectional view of the CF substrate, in which the cross-sectional structure corresponding to the IPS liquid crystal mode is shown and no counter electrode exists in a pixel portion. FIG. 5 is a cross-sectional view taken along with a dotted line A-A of FIG. 1 similarly to the above-described embodiment.

As shown in FIG. 5, as the longitudinal structure of the region 3 having high wettability, a shield region 5 of a light shielding layer, a color material 6 of a transmission layer and an organic film 17 having high wettability are sequentially laminated on the glass substrate 4 from a lower layer thereof.

The organic film 17 having high wettability is mainly formed in the display region and needs to be a transparent film. As the material thereof, thermosetting type acrylic resin or polyimide resin is preferable. As the longitudinal structure of the region 2 having low wettability, an organic film 8 having low wettability is formed on the glass substrate 4. The surface 9 of the organic film 8 needs to have an oil repelling property for repelling the material 16 of the alignment film and thus the surface 9 of the organic film has fine irregularities. As a material thereof, organic fluoride or acrylic resin of photocurable resin, polyimide resin or the like may be used.

In the CF substrate 1 shown in Embodiment 1 or 2, although the organic film 8 having low wettability is formed on the glass substrate 4 in the region 2 having low wettability, wettability of the material used for the organic film 8 is not specially problematic and wettability of the surface 9 is preferably low. After the organic material having relatively high wettability is applied, surface treatment such as fluorine processing or irregularities such as fine projections are formed in the surface such as a nanotube to realize the surface 9 of the organic film having low wettability.

In the CF substrate which is one of a pair of substrates facing each other and constituting the liquid crystal panel, the example of dividing the glass substrate into regions having different wettability and selectively applying the alignment film is described in Embodiment 1 or 2. However, the substrate divided into the regions may not be a CF substrate and the TFT substrate which is another substrate of the liquid crystal panel may be divided.

What is claimed is:

1. A method of applying an alignment film on a substrate of a liquid crystal panel, the method comprising:
   forming on the substrate, a surface having high wettability and a surface having low wettability with respect to a material of the alignment film, wherein the surface having high wettability corresponds to a display region of the liquid crystal panel, and the surface having low wettability corresponds to a peripheral region of the display region and includes a region where at least one of a peripheral seal material is to be formed, a mounting member is to be attached, or an inspection terminal onto which a needle is brought into contact upon inspection is to be located;
   applying the material of the alignment film on the substrate by bringing uniformly the material of the alignment film into contact with the surface having high wettability and the surface having low wettability by using a transfer plate, wherein the transfer plate has a solid pattern; and
   separating the transfer plate and the surface of the substrate such that the material of the alignment film is left on the surface having high wettability and the material of the alignment film is not left on the surface having low wettability,
   wherein the material of the alignment film brought into contact with the surface having low wettability is left on the transfer plate.

2. The method according to claim 1, wherein the substrate is a color filter substrate.

3. The method according to claim 1, wherein the surface having low wettability includes irregularities with fine projections.

* * * * *